US011679540B2

(12) United States Patent
Maruyama et al.

(10) Patent No.: US 11,679,540 B2
(45) Date of Patent: Jun. 20, 2023

(54) PLASTICIZING DEVICE, INJECTION MOLDING APPARATUS, AND THREE-DIMENSIONAL SHAPING APPARATUS

(71) Applicant: SEIKO EPSON CORPORATION, Tokyo (JP)

(72) Inventors: Hidenobu Maruyama, Azumino (JP); Daichi Miyashita, Matsumoto (JP); Yasuyuki Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 17/445,244

(22) Filed: Aug. 17, 2021

(65) Prior Publication Data
US 2022/0055274 A1 Feb. 24, 2022

(30) Foreign Application Priority Data

Aug. 19, 2020 (JP) .............................. JP2020-138558

(51) Int. Cl.
| *B29C 45/46* | (2006.01) |
| *B29C 45/58* | (2006.01) |
| *B29C 64/314* | (2017.01) |
| *B29C 45/20* | (2006.01) |
| *B33Y 30/00* | (2015.01) |

(52) U.S. Cl.
CPC ............ *B29C 45/464* (2013.01); *B29C 45/20* (2013.01); *B29C 45/58* (2013.01); *B29C 64/314* (2017.08); *B33Y 30/00* (2014.12)

(58) Field of Classification Search
CPC ....... B29C 45/464; B29C 45/20; B29C 45/58; B29C 45/54
See application file for complete search history.

(56) References Cited

U.S. PATENT DOCUMENTS

2006/0017190 A1* 1/2006 Pallmann ............... B30B 11/227
425/207

FOREIGN PATENT DOCUMENTS

| EP | 3287252 A1 * | 2/2018 | ............ B29C 45/17 |
| JP | 2010-052264 A | 3/2010 | |
| JP | 2010052264 A * | 3/2010 | |
| JP | 2010-241016 A | 10/2010 | |
| WO | 2007/034549 A | 3/2007 | |

* cited by examiner

Primary Examiner — Kelly M Gambetta
Assistant Examiner — Virak Nguon
(74) Attorney, Agent, or Firm — Workman Nydegger

(57) ABSTRACT

A plasticizing device includes a driving motor, a rotor rotated around a rotation axis by the driving motor and having a groove forming surface on which a groove is formed, a barrel having an opposed surface opposed to the groove forming surface, a communication hole into which a plasticized material flows being provided in the barrel, a housing section housing the rotor, a first restricting section fixed to the rotor and having a first contact surface facing the barrel side, and a second restricting section fixed to the housing section, opposed to the first contact surface, and having a second contact surface contactable with the first contact surface. Movement of the rotor along the rotation axis is restricted by the first restricting section and the second restricting section. The groove forming surface is separated from the opposed surface at a predetermined interval in a state in which the first contact surface and the second contact surface are in contact.

11 Claims, 12 Drawing Sheets

PLASTICIZING DEVICE, INJECTION MOLDING APPARATUS, AND THREE-DIMENSIONAL SHAPING APPARATUS

The present application is based on, and claims priority from JP Application Serial Number 2020-138558, filed Aug. 19, 2020, the disclosure of which is hereby incorporated by reference herein in its entirety.

BACKGROUND

1. Technical Field

The present disclosure relates to a plasticizing device, an injection molding apparatus, and a three-dimensional shaping apparatus.

2. Related Art

JP-A-2010-241016 (Patent Literature 1) discloses an injection molding apparatus that plasticizes a material with a rotor, on an end face of which a spiral groove is formed, and a barrel that comes into contact with the end face of the rotor.

In Patent Literature 1, when the material is plasticized, the rotor rotates while keeping a state in which the rotor and the barrel are in contact. Accordingly, it is likely that the rotor and the barrel are worn to have deteriorated durability. Such a problem is not limited to the injection molding apparatus and is common to a plasticizing device and a three-dimensional shaping apparatus including a rotor and a barrel.

SUMMARY

According to a first aspect of the present disclosure, there is provided a plasticizing device that plasticizes at least a part of a material to generate a plasticized material. The plasticizing device includes: a driving motor; a rotor rotated around a rotation axis by the driving motor and having a groove forming surface on which a groove is formed; a barrel having an opposed surface opposed to the groove forming surface, a communication hole into which the plasticized material flows being provided in the barrel; a housing section housing the rotor; a first restricting section fixed to the rotor and having a first contact surface facing the barrel side; and a second restricting section fixed to the housing section, opposed to the first contact surface, and having a second contact surface contactable with the first contact surface. Movement of the rotor along the rotation axis is restricted by the first restricting section and the second restricting section. The groove forming surface is separated from the opposed surface at a predetermined interval in a state in which the first contact surface and the second contact surface are in contact.

A second aspect of the present disclosure is directed to an injection molding apparatus including: the plasticizing device in the aspect described above; and a nozzle for ejecting, to a molding die, the plasticized material flowing out from the communication hole.

A third aspect of the present disclosure is directed to a three-dimensional shaping apparatus including: the plasticizing device in the aspect described above; and a nozzle for discharging, toward a shaping table, the plasticized material flowing out from the communication hole.

DESCRIPTION OF EXEMPLARY EMBODIMENTS

A. First Embodiment

Figure 1:
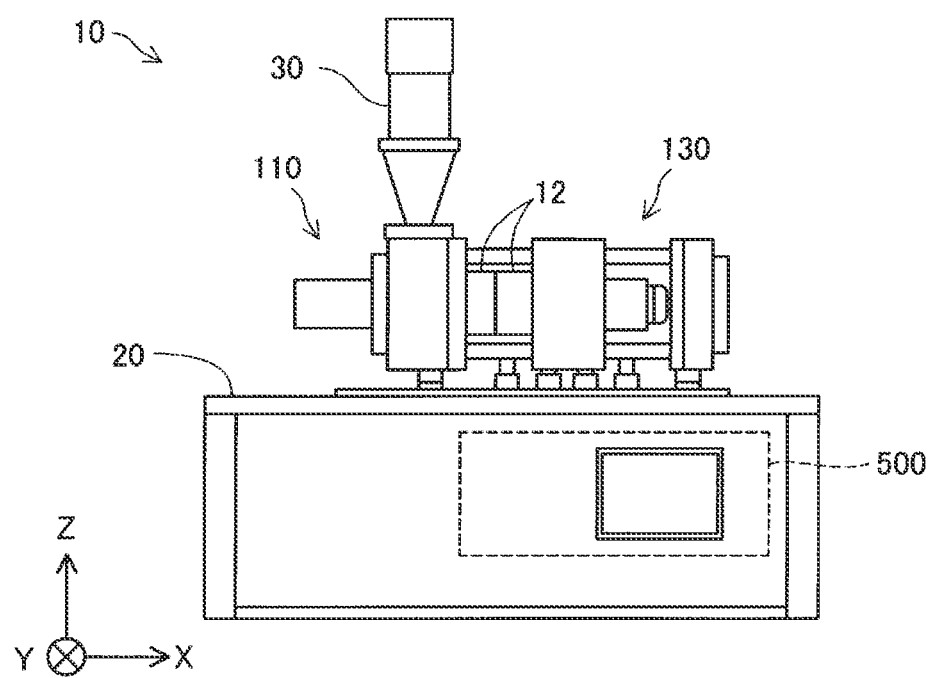
FIG. 1 is a front view showing a schematic configuration of an injection molding apparatus in a first embodiment.

FIG. 1 is a front view showing a schematic configuration of an injection molding apparatus 10 in a first embodiment. In FIG. 1, arrows indicating X, Y, and Z directions orthogonal to one another are shown. The X direction and the Y direction are directions parallel to the horizontal plane. The Z direction is a direction opposite to the gravity direction. X, Y, and Z directions shown in FIG. 2 and the subsequent figures correspond to the X, Y, and Z directions shown in FIG. 1. In the following explanation, when directions are specified, a positive direction, which is a direction pointed by an arrow, is represented as "+" and a negative direction, which is the opposite direction of the direction pointed by the arrow, is represented as "−". The plus and minus signs are used in combination for direction notation.

The injection molding apparatus 10 includes a plasticizing device 110 and a mold clamping device 130. The plasticizing device 110 and the mold clamping device 130 are respectively fixed to a base 20. A control section 500 is provided in the base 20. The injection molding apparatus 10 ejects, from the plasticizing device 110, a plasticized material into a molding die 12 attached to the mold clamping device 130 and forms a molded article. In this embodiment, the molding die 12 made of metal is attached to the mold clamping device 130. The molding die 12 attached to the mold clamping device 130 is not limited to be made of metal and may be made of resin or made of ceramic. The molding die 12 made of metal is called metal mold.

A hopper 30, into which a material of a molded article is deposited, is connected to the plasticizing device 110. As the material of the molded article, for example, thermoplastic resin formed in a pellet shape is used.

The plasticizing device 110 plasticizes at least a part of the material supplied from the hopper 30 to generate a plasticized material and ejects the plasticized material to the molding die 12 attached to the mold clamping device 130. In this embodiment, "plasticizing" means that heat is applied to a material having thermoplasticity and the material is melted. "Melting" means not only that the material having thermoplasticity is heated to temperature equal to or higher than a melting point and changes to a liquid state but also that the material having thermoplasticity is heated to temperature equal to or higher than a glass transition point to be softened and fluidity is developed.

The control section 500 is configured by a computer including one or a plurality of processors, a main storage device, and an input and output interface that receives signals from and outputs signals to the outside. The processor reads a program onto the main storage device and executes the program, whereby the control section 500 controls the plasticizing device 110 and the mold clamping device 130 and performs manufacturing of a molded article.

Figure 2:
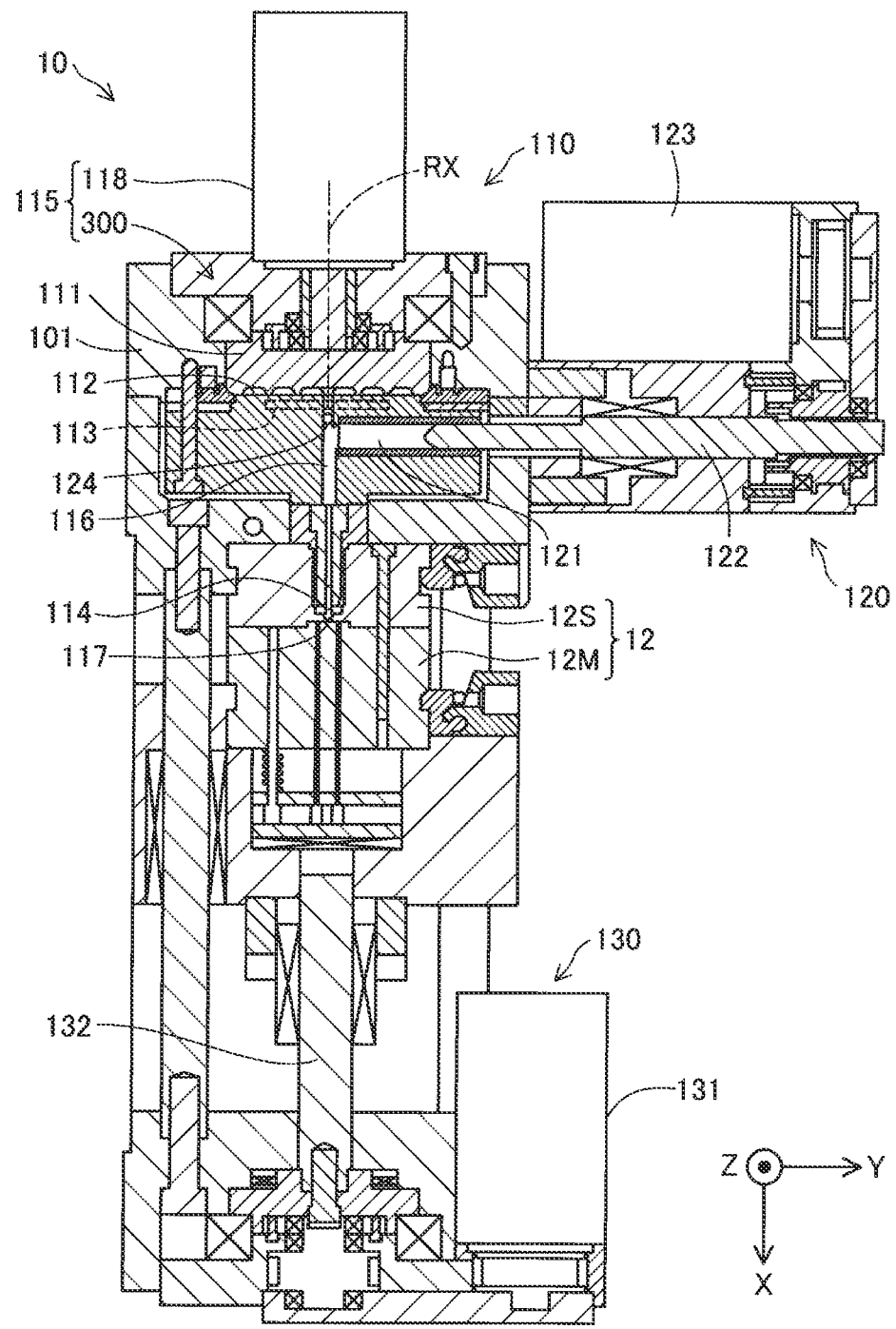
FIG. 2 is a sectional view showing a schematic configuration of the injection molding apparatus.

FIG. 2 is a sectional view showing a schematic configuration of the injection molding apparatus 10. As explained above, the injection molding apparatus 10 includes the plasticizing device 110, the mold clamping device 130, and the molding die 12 and includes an injection control mechanism 120.

The plasticizing device 110 includes a rotor 111, a barrel 112, a heater 113, and a nozzle 114. The rotor 111 is housed in a housing section 101. The rotor 111 is called scroll or flat screw as well. The rotor 111 is driven to rotate in the housing section 101 around a rotation axis RX by a screw driving section 115 configured by a driving motor 118 and a speed reducer 300. In this embodiment, the X direction is a direction along the rotation axis RX. A communication hole 116 is formed in the center of the barrel 112. An injection cylinder 121 explained below is connected to the communication hole 116. In the communication hole 116, a check valve 124 is provided upstream of the injection cylinder 121. The rotation of the rotor 111 by the screw driving section 115 and heating by the heater 113 are controlled by the control section 500.

Figure 3:
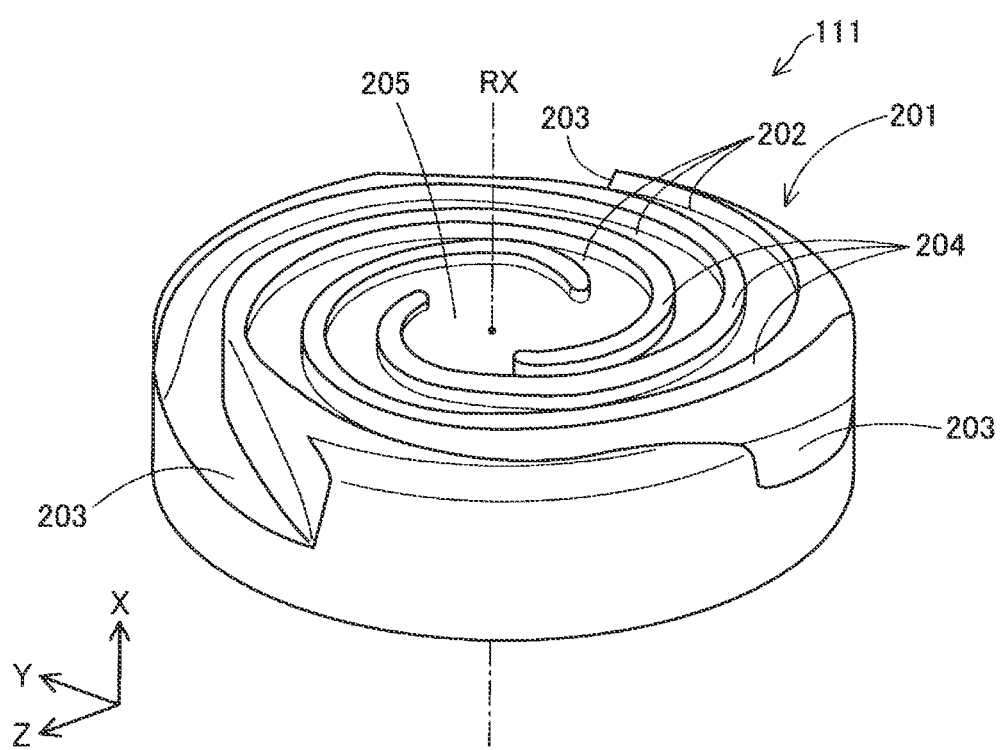
FIG. 3 is a perspective view showing a schematic configuration of a rotor.

FIG. 3 is a perspective view showing a schematic configuration of the rotor 111. The rotor 111 has a substantially columnar shape, the height of which in a direction along the center axis thereof is smaller than the diameter thereof. Swirl-like grooves 202 are formed centering on a center section 205 on a groove forming surface 201 of the rotor 111 opposed to the barrel 112. The grooves 202 communicate with a material depositing port 203 formed on a side surface of the rotor 111. The material supplied from the hopper 30 is supplied to the grooves 202 through the material depositing port 203. The grooves 202 are formed by being partitioned by convex ridge sections 204. In FIG. 3, an example in which three grooves 202 are formed is shown. However, the number of the grooves 202 may be one or may be two or more. The grooves 202 are not limited to the swirl shape and may have a spiral shape, may have an involute curve shape, or may have a shape extending to draw an arc from the center section toward the outer circumference.

Figure 4:
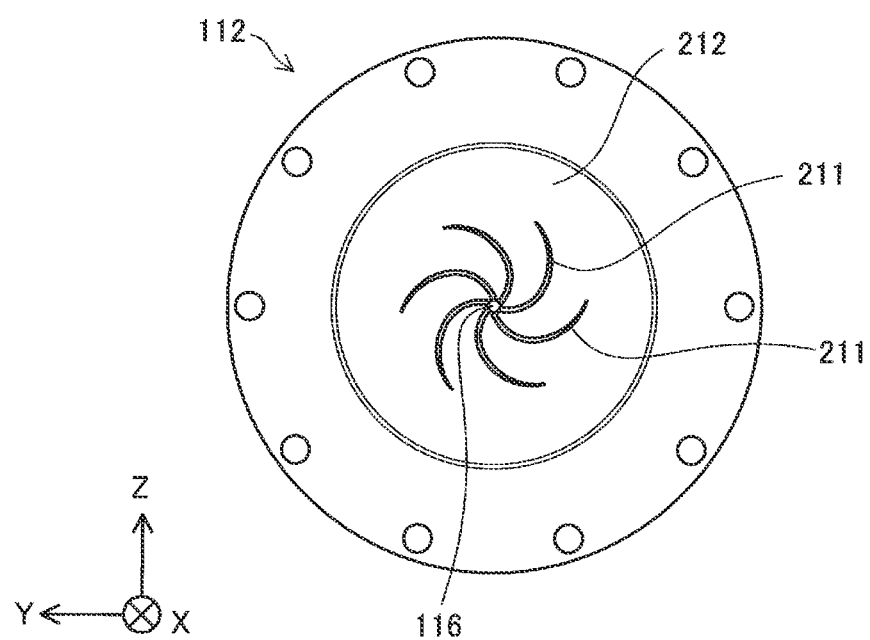
FIG. 4 is a schematic plan view of a barrel.

FIG. 4 is a schematic plan view of the barrel 112. The barrel 112 has an opposed surface 212 opposed to the groove forming surface 201 of the rotor 111. The communication hole 116 is formed in the center of the opposed surface 212. A plurality of guide grooves 211 connected to the communication hole 116 and extending in a swirl shape from the communication hole 116 toward the outer circumference are formed on the opposed surface 212. The material supplied to the grooves 202 of the rotor 111 flows along the grooves 202 and the guide grooves 211 according to rotation of the rotor 111 while being plasticized between the rotor 111 and the barrel 112 by the rotation of the rotor 111 and the heating by the heater 113 and is guided to the center section 205 of the rotor 111. The material flowing into the center section 205 is guided from the communication hole 116 provided in the center of the barrel 112 to the injection control mechanism 120. The guide grooves 211 may not be provided in the barrel 112.

As shown in FIG. 2, the injection control mechanism 120 includes an injection cylinder 121, a plunger 122, and a plunger driving section 123. The injection control mechanism 120 has a function of ejecting and injecting a plasticized material in the injection cylinder 121 into a cavity 117 explained below. The injection control mechanism 120 controls an ejection amount of the plasticized material from the nozzle 114 under the control by the control section 500. The injection cylinder 121 is a substantially cylindrical member connected to the communication hole 116 of the barrel 112 and includes the plunger 122 on the inside. The plunger 122 slides on the inside of the injection cylinder 121 and pressure-feeds the plasticized material in the injection cylinder 121 to the nozzle 114 included in the plasticizing device 110. The plunger 122 is driven by the plunger driving section 123 configured by a motor.

The molding die 12 includes a movable die 12M and a stationary die 12S. The movable die 12M and the stationary die 12S are provided to face each other. The molding die 12 includes a cavity 117, which is a space corresponding to a shape of a molded article, between the movable die 12M and the stationary die 12S. The plasticized material flowing out from the communication hole 116 of the barrel 112 is pressure-fed to the cavity 117 by the injection control mechanism 120 and ejected from the nozzle 114.

The mold clamping device 130 includes a molding-die driving section 131 and has a function of opening and closing the movable die 12M and the stationary die 12S. The mold clamping device 130 drives, under the control by the control section 500, the molding-die driving section 131 configured by a motor to thereby rotate a ball screw 132 and moves the movable die 12M combined with the ball screw 132 with respect to the stationary die 12S to open and close the molding die 12. That is, the stationary die 12S is standing still in the injection molding apparatus 10. The movable die 12M moves relatively to the standing-still stationary die 12S, whereby the molding die 12 is opened and closed.

Figure 5:
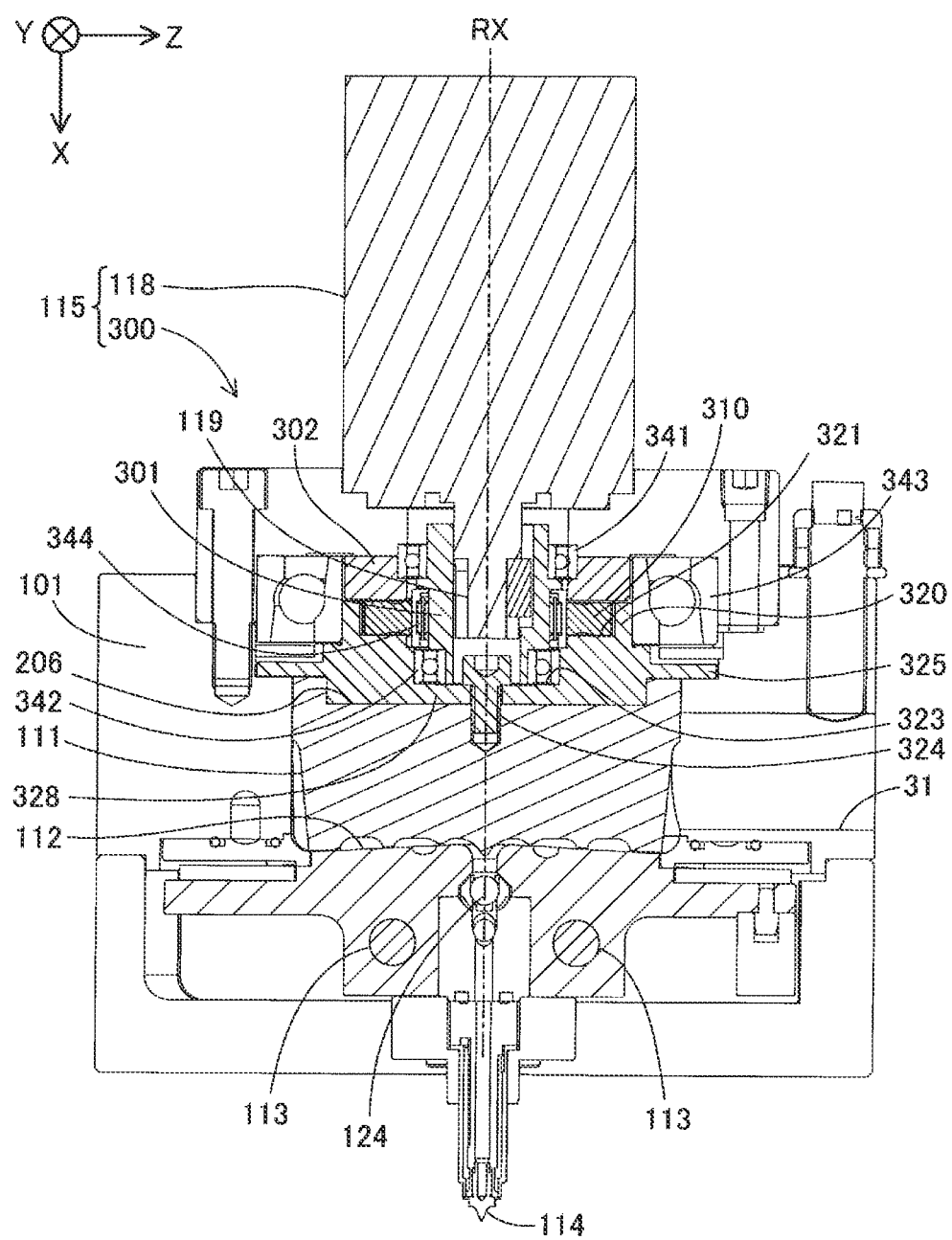
FIG. 5 is a sectional view showing the structure of a speed reducer.
Figure 6:
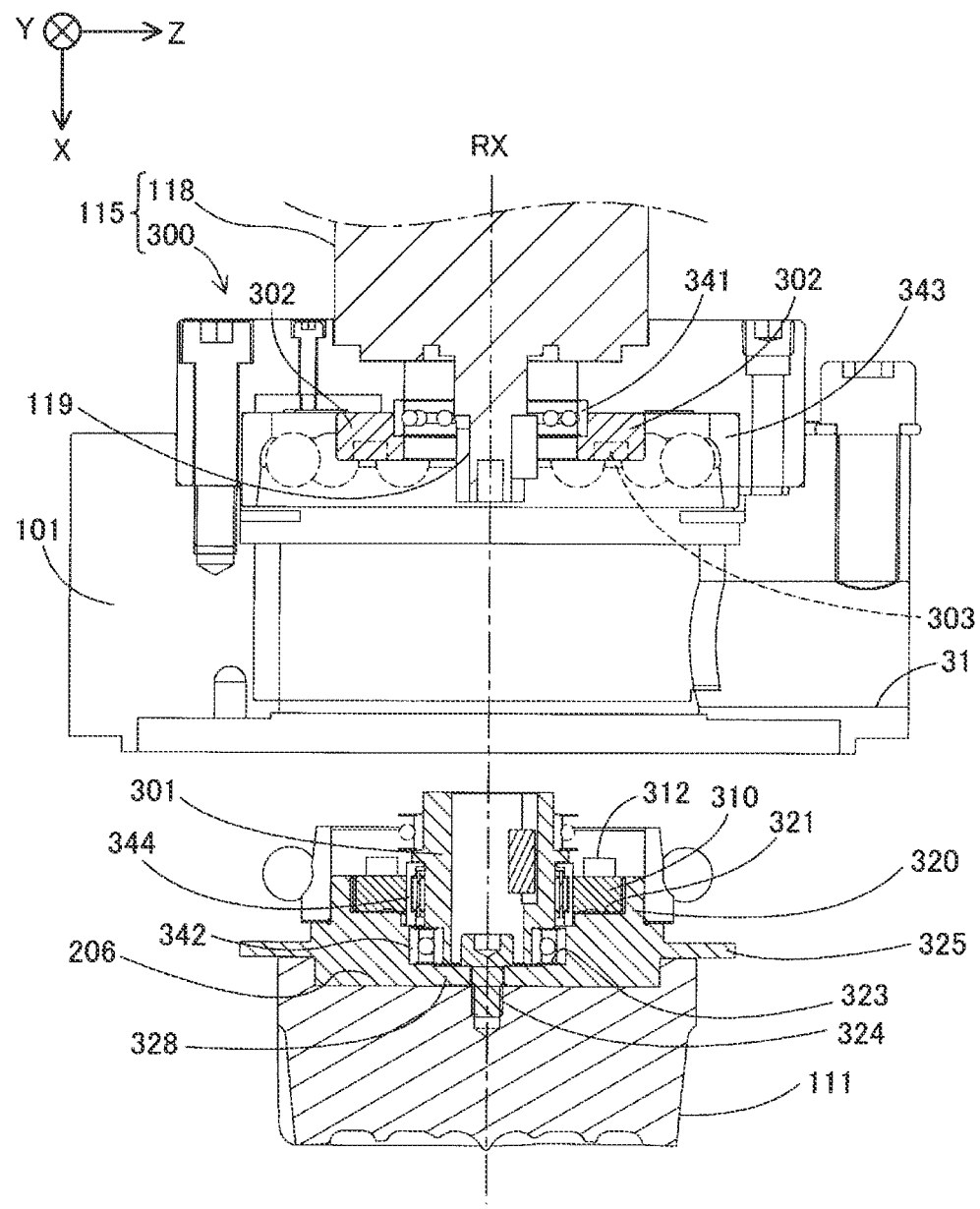
FIG. 6 is a partially exploded sectional view of the speed reducer.
Figure 7:
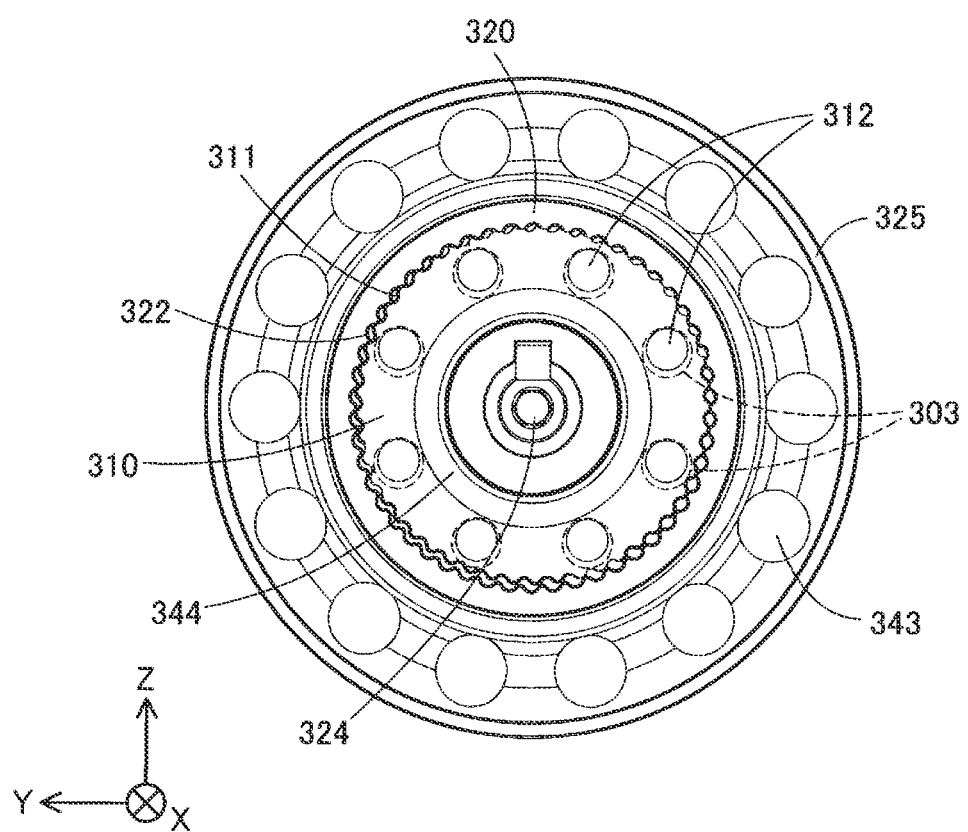
FIG. 7 is a plan view of a first gear and a second gear viewed in a +X direction.

FIG. 5 is a sectional view showing the structure of the speed reducer 300. FIG. 6 is a partially exploded sectional view of the speed reducer 300. FIG. 7 is a plan view of a first gear 310 and a second gear 320 included in the speed reducer 300 viewed in a +X direction. In sectional views subsequent to FIG. 5, hatching in cross sections is omitted as appropriate. A cross section shown in FIG. 5 indicates a cross section in a direction different from the direction of the cross section shown in FIG. 3. A state in which a material passage 31 communicating with the hopper 30 extends in a +Z direction is shown in FIG. 5. The speed reducer 300 in this embodiment is a speed reducer of a coaxial type in which an input shaft and an output shaft are present on the same axis.

The speed reducer 300 includes a substantially cylindrical eccentric body 301 fixed to an output shaft 119 of the driving motor 118, a first gear 310 configured as a planetary gear, and a second gear 320 configured as a sun internal gear.

The end portion on the driving motor 118 side of the eccentric body 301 is axially supported by a first ball bearing 341 fixed to the housing section 101. The end portion on the rotor 111 side of the eccentric body 301 is axially supported by a second ball bearing 342 pressed into the inner circumference of the second gear 320. The outer circumference of a portion of the eccentric body 301 fixed to the first ball bearing 341 and the outer circumference of a portion of the eccentric body 301 fixed to the second ball bearing 342 have perfect circular shapes centering on the output shaft 119 of the driving motor 118. In contrast, a portion of the eccentric body 301 sandwiched between the first ball bearing 341 and the second ball bearing 342 has a perfect circular shape having a center axis eccentric with respect to the output shaft 119 of the driving motor 118. In the following explanation, when the eccentric body 301 is simply referred to, the eccentric body 301 indicates the portion of the eccentric body 301 sandwiched between the first ball bearing 341 and the second ball bearing 342.

The first gear 310 has an annular shape. A needle bearing 344 is pressed into the inner circumferential portion of the first gear 310 and fixed. As shown in FIG. 7, wavy external teeth 311 are formed on the outer circumference of the first gear 310. A plurality of pins 312 are disposed on the first gear 310 at equal intervals in the circumferential direction when viewed in the +X direction. The pins 312 are respectively disposed in pin receiving recesses 303. As shown in FIG. 6, a plurality of pin receiving recesses 303 are formed in an annular pin receiving section 302 fixed to the circumference of the eccentric body 301 in the housing section 101. As shown in FIG. 7, the respective pin receiving recesses 303 are opened toward the +X-direction side and have a diameter larger than the diameter of the pins 312. Accordingly, the pins 312 can move in the Y direction and the Z direction, which are directions perpendicular to the rotation axis RX in the pin receiving recesses 303.

As shown in FIG. 5, the second gear 320 has a bottomed tubular shape opened on an end face on the −X-direction side. A first recess 321 is formed on the end face on the −X-direction side of the second gear 320. A second recess 323 is further formed in the bottom of the first recess 321. The first gear 310 is housed in the first recess 321. Wavy internal teeth 322, with which the external teeth 311 of the first gear 310 shown in FIG. 7 are in contact, are formed on the inner circumference of the first recess 321. The second ball bearing 342 axially supporting the end portion on the +X-direction side of the eccentric body 301 is pressed into the second recess 323 and fixed.

A hollow 206 is formed on the end face on the −X-direction side of the rotor 111. A bottom 328 of the second gear 320 is fit in the hollow 206. Idle rotation prevention machining such as D cut machining is applied to the hollow 206 and the bottom 328. The rotor 111 is fixed to the bottom 328 of the second gear 320 by a bolt 324 functioning as a fixing section in the direction of the rotation axis RX. That is, the rotor 111 is integrated with the second gear 320. Accordingly, when the second gear 320 moves along the rotation axis RX, the rotor 111 also moves along the rotation axis RX according to the movement of the second gear 320. The second gear 320 and the rotor 111 are not limited to be fixed by the bolt 324 and may be fixed by another fixing section such as a rivet. The bolt 324 is not limited to one bolt. A plurality of bolts may be used to fix the second gear 320 and the rotor 111.

A brim-like first restricting section 325 is formed on the outer circumference of the second gear 320. Details of the first restricting section 325 are explained below. A portion of the second gear 320 further on the −X-direction side than the first restricting section 325 is axially supported by a third ball bearing 343 fixed to the housing section 101 on the outer circumference side of the pin receiving section 302. In this embodiment, the third ball bearing 343 is configured as a single row angular bearing that receives a load in the −X direction from the rotor 111.

The operation of the speed reducer 300 is explained. When the driving motor 118 rotates, the eccentric body 301 fixed to the output shaft 119 of the driving motor 118 rotates. The eccentric body 301 partially comes into contact with the needle bearing 344 provided on the inner circumference of the first gear 310 while rotating. When the eccentric body 301 comes into contact with the needle bearing 344, the first gear 310 receives a driving force from the eccentric body 301 and swings in a X-Y direction crossing the rotation axis RX in a state in which the pins 312 are housed in the pin receiving recesses 303. According to the movement of the first gear 310, the external teeth 311 of the first gear 310 partially come into contact with the internal teeth 322 of the second gear 320 in order. The second gear 320 rotates at a predetermined reduction ratio determined by the number of external teeth 311 of the first gear 310 and the number of internal teeth 322 of the second gear 320. The rotor 111 fixed to the second gear 320 rotates in the housing section 101 according to the rotation of the second gear 320. In FIG. 6, the structure of the speed reducer 300 operating in this way is shown as being vertically divided into a portion fixed to the housing section 101 and a portion that moves with a driving force of the driving motor 118.

Figure 8:
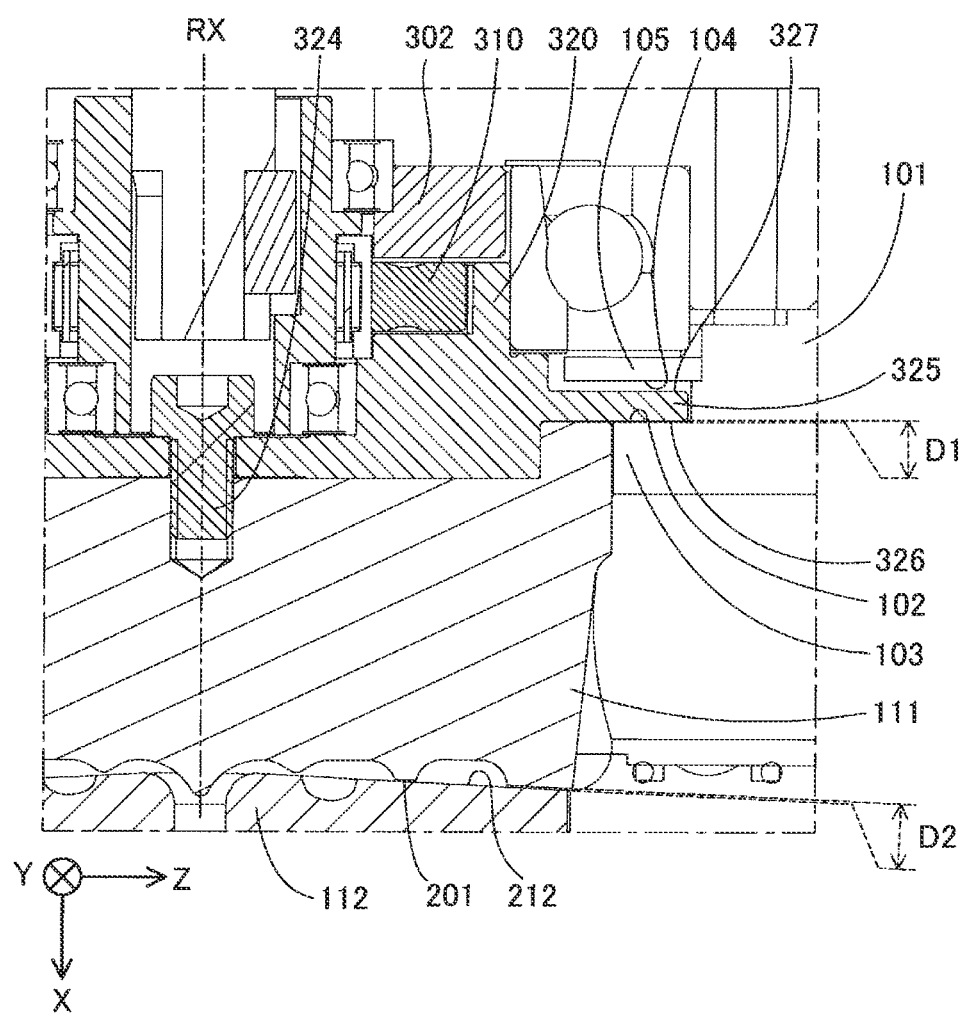
FIG. 8 is an enlarged sectional view of the vicinity of a first restricting section.

FIG. 8 is an enlarged sectional view of the vicinity of the first restricting section 325. As explained above, the brim-like first restricting section 325 is formed on the outer circumference of the second gear 320. Since the rotor 111 is fixed to the second gear 320, the first restricting section 325 is considered to be indirectly fixed to the rotor 111.

The first restricting section 325 has a first contact surface 326 facing the barrel 112 side, that is, the +X-direction side. The housing section 101 includes a second restricting section 103 having a second contact surface 102 opposed to the first contact surface 326. The second restricting section 103 may be provided integrally with the housing section 101 or may be formed separately from the housing section 101 and joined to the housing section 101. The second contact surface 102 is opposed to the first contact surface 326 in the direction of the rotation axis RX and is contactable with the first contact surface 326. "Contactable" means that the second contact surface 102 can come into both of a state in which the second contact surface 102 is not in contact with the first contact surface 326 and a state in which the second contact surface 102 is in contact with the first contact surface 326. The rotor 111 is restricted by the first restricting section 325 and the second restricting section 103 from moving along the rotation axis RX, more specifically, moving in the +X direction by a predetermined amount or more.

The groove forming surface 201 of the rotor 111 is separated from the opposed surface 212 at a predetermined interval in a state in which the first contact surface 326 of the first restricting section 325 and the second contact surface 102 of the second restricting section 103 are in contact. The interval is, for example, 0.1 mm. The interval between the groove forming surface 201 and the opposed surface 212 means the shortest interval in a position where the grooves 202 and the guide grooves 211 are not formed.

Grease may be applied between the first contact surface 326 and the second contact surface 102 in order to reduce sliding resistance between the first contact surface 326 and the second contact surface 102. Low friction coating by fluorocarbon resin or the like may be applied to these surfaces. Besides, the first restricting section 325 or the second restricting section 103 may be formed by a member having a low friction coefficient.

As explained above, the rotor 111 is fixed to the second gear 320 of the speed reducer 300 by the bolt 324. The bolt 324 fixes the second gear 320 and the rotor 111 in a position where the groove forming surface 201 of the rotor 111 is separated from the opposed surface 212 of the barrel 112 at the interval explained above in a state in which the first contact surface 326 and the second contact surface 102 are in contact. Accordingly, in a state in which the first contact surface 326 and the second contact surface 102 are not in contact, the groove forming surface 201 of the rotor 111 and the opposed surface 212 of the barrel 112 are separated at an interval exceeding the interval explained above.

With the configuration explained above, a first distance D1 between the first contact surface 326 and the second contact surface 102 is smaller than a second distance D2 between the groove forming surface 201 of the rotor 111 and the opposed surface 212 of the barrel 112 irrespective of a contact state of the first contact surface 326 and the second contact surface 102. During a normal operation, the first distance D1 between the first contact surface 326 and the second contact surface 102 is, for example, 0.1 mm and the second distance D2 between the groove forming surface 201 of the rotor 111 and the opposed surface 212 of the barrel 112 is, for example, 0.2 mm. If the first distance D1 and the second distance D2 are set in this way, even if the first contact surface 326 and the second contact surface 102 are in contact, a gap of at least 0.1 mm is formed between the rotor 111 and the barrel 112. The rotor 111 and the barrel 112 do not come into contact. The second distance D2 is a distance at which the material supplied to between the rotor 111 and the barrel 112 can be plasticized and is decided by performing an experiment or a simulation in advance.

In this embodiment, the first restricting section 325 further has a third contact surface 327 on the opposite side of the first contact surface 326 in the direction along the rotation axis RX. The housing section 101 includes a third restricting section 105 having a fourth contact surface 104 contactable with the third contact surface 327. That is, in this embodiment, the first restricting section 325 fixed to the rotor 111 is disposed to be sandwiched between the second restricting section 103 and the third restricting section 105 provided in the housing section 101. Movement by a predetermined amount or more in the −X direction of the rotor 111 is restricted by the third restricting section 105 and the first restricting section 325. The distance between the third contact surface 327 and the fourth contact surface 104 is set to, for example, a distance smaller than a backlash of the third ball bearing 343 in the direction along the rotation axis RX. The third restricting section 105 can be omitted.

Figure 9:
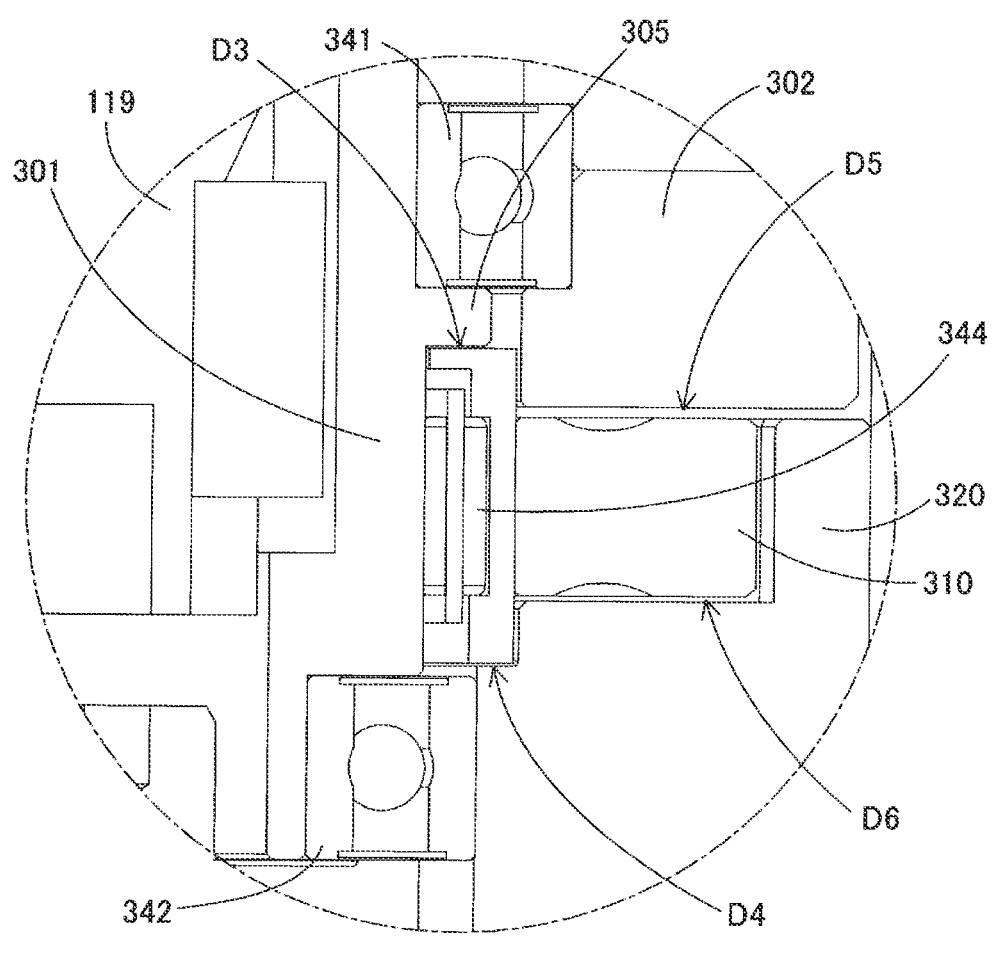
FIG. 9 is an enlarged sectional view for explaining intervals among members.

FIG. 9 is an enlarged sectional view for explaining intervals among members in the direction along the rotation axis RX. As shown in FIG. 9, a brim section 305 is formed on the outer circumference of the eccentric body 301. A third distance D3 between the brim section 305 and the needle bearing 344 fixed to the first gear 310 is, for example, 0.1 mm. A fourth distance D4 between the needle bearing 344 and the second gear 320 is, for example, 0.1 mm. Further, a fifth distance D5 between the first gear 310, to which the needle bearing 344 is fixed, and the pin receiving section 302 is, for example, 0.5 mm. A sixth distance D6 between the first gear 310 and the second gear 320 is, for example, 0.2 mm. That is, there is a relation that the third distance D3 and the fourth distance D4 are smaller than the sixth distance D6 and the fifth distance D5 is larger than the sixth distance D6. In such a relation among the distances, it is possible to prevent the first gear 310 from coming into contact with the second gear 320 by reducing the intervals between the needle bearing 344 and the other members located above and below the needle bearing 344. Accordingly, it is possible to prevent wear of the first gear 310 and the second gear 320.

With the injection molding apparatus 10 in this embodiment configured as explained above, even when the rotor 111 moves to the barrel 112 side along the rotation axis RX, the first restricting section 325 fixed to the rotor 111 comes into contact with the second restricting section 103 fixed to the housing section 101 before the rotor 111 comes into contact with the barrel 112. Accordingly, even when the material supply from the hopper 30 is stopped or when the material passage 31 is clogged with the material, for example, during continuous molding, the rotor 111 and the barrel 112 do not come into contact. For example, even when a backlash in the direction along the rotation axis RX increases according to aged deterioration of the third ball bearing 343, the rotor 111 and the barrel 112 do not come into contact. Further, even when the rotor 111 is idly rotated during maintenance or the like of the injection molding apparatus 10, the rotor 111 and the barrel 112 does not come into contact. Therefore, according to this embodiment, the rotor 111 is prevented from rotating while keeping a state in which the rotor 111 is in contact with the barrel 112. Therefore, it is possible to prevent the rotor 111 and the barrel 112 from being worn to have deteriorated durability.

In this embodiment, the speed reducer 300 and the rotor 111 are fixed by the bolt 324 in a position where the rotor 111 is separated from the barrel 112 at a predetermined interval in a state in which the first contact surface 326 and the second contact surface 102 are in contact. Accordingly, the rotor 111 can be fixed to the speed reducer 300 to prevent the rotor 111 and the barrel 112 from coming into contact.

In this embodiment, since the rotor 111 is fixed to the second gear 320 included in the speed reducer 300, it is possible to more surely prevent the rotor 111 from coming into contact with the barrel 112.

In this embodiment, since the first restricting section 325 is provided in the second gear 320, it is possible to prevent the rotor 111 from being worn by contact of the first restricting section 325 and the second restricting section 103. As a result, it is possible to improve durability of the rotor 111.

In this embodiment, irrespective of a contact state of the first contact surface 326 and the second contact surface 102, the distance D1 between the first contact surface 326 and the second contact surface 102 is smaller than the second distance D2 between the groove forming surface 201 of the rotor 111 and the opposed surface 212 of the barrel 112. Accordingly, it is possible to more surely prevent the rotor 111 from coming into contact with the barrel 112.

In this embodiment, the first restricting section 325 has the third contact surface 327 on the opposite side of the first contact surface 326. The housing section 101 includes the third restricting section 105 having the fourth contact surface 104 contactable with the third contact surface 327. Accordingly, it is possible to prevent the rotor 111 from excessively moving to the driving motor 118 side in the direction along the rotation axis RX. As a result, it is possible to prevent plasticizing performance of the material from being deteriorated by the movement of the rotor 111 to the driving motor 118 side.

B. Second Embodiment

Figure 10:
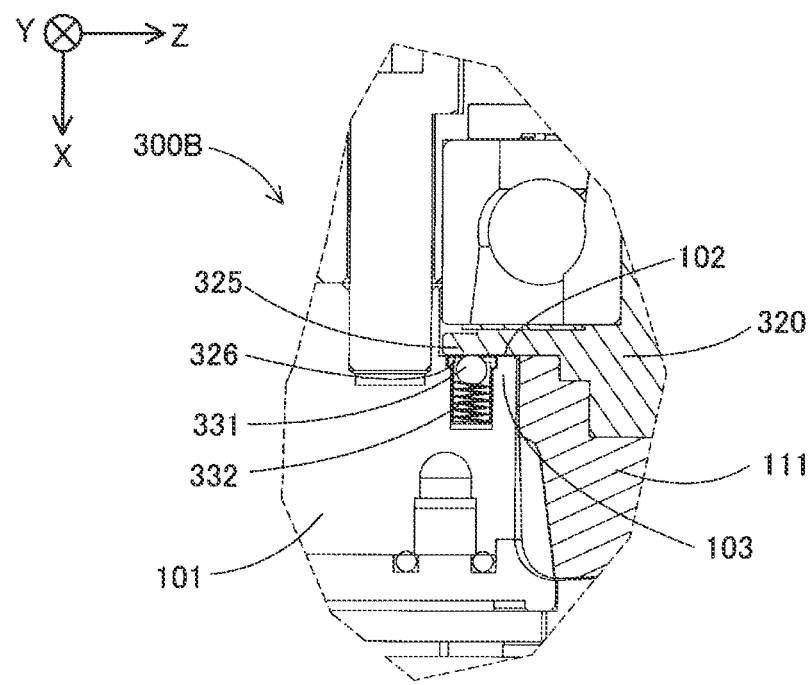
FIG. 10 is an enlarged sectional view for explaining the structure of a speed reducer in a second embodiment.

FIG. 10 is an enlarged sectional view for explaining the structure of a speed reducer 300B in a second embodiment. In the second embodiment, a spherical rotating body 331 is provided on the second contact surface 102 of the second restricting section 103 provided in the housing section 101. The rotating body 331 is urged from the +X-direction side toward the first restricting section 325 by an elastic body 332 configured by a coil spring. The rotating body 331 and the elastic body 332 can be configured by, for example, a ball plunger or a press-fit plunger. The rotating body 331 is formed by, for example, metal such as SUS or resin such as polyacetal (POM).

Figure 11:
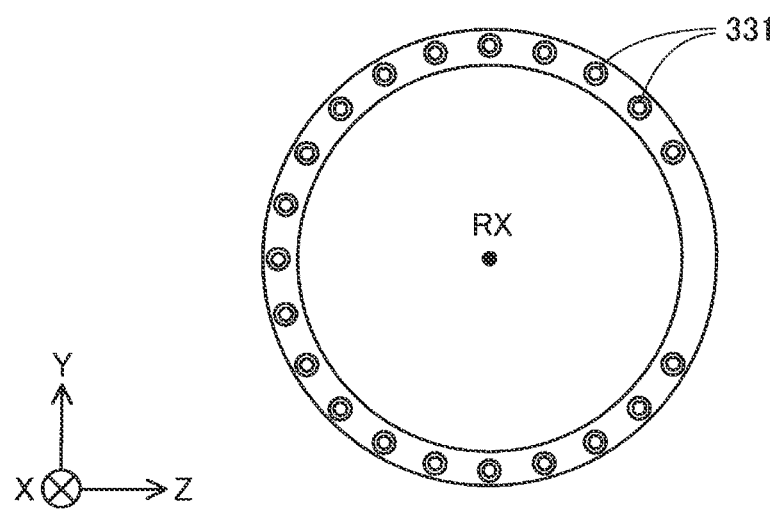
FIG. 11 is a plan view showing the disposition of rotating bodies.

FIG. 11 is a plan view showing disposition of a plurality of rotating bodies 331. As shown in FIG. 11, the plurality of rotating bodies 331 are provided along a circumferential direction centering on the rotation axis RX in the circumference of the rotor 111 to be in contact with the first restricting section 325. However, as shown in FIG. 11, the rotating bodies 331 may not be provided in a region overlapping the material passage 31 shown in FIG. 5 in the X direction.

According to the second embodiment explained above, since the rotating bodies 331 are disposed between the first restricting section 325 and the second restricting section 103, it is possible to reduce sliding resistance between the first restricting section 325 and the second restricting section 103. Since the first restricting section 325 is prevented from approaching the second restricting section 103 by the rotating bodies 331, it is possible to prevent the rotor 111 from coming into contact with the barrel 112. In this embodiment, since the rotating bodies 331 are urged to the first restricting section 325 side by a plurality of elastic bodies 332, it is possible to more surely prevent the rotor 111 from coming into contact with the barrel 112. In this embodiment, since the plurality of rotating bodies 331 are provided along the circumferential direction centering on the rotation axis RX, it is possible to prevent rotation axis deflection from occurring in the rotor 111.

In this embodiment, the rotating bodies 331 are provided on the second contact surface 102. However, the rotating bodies 331 may be provided on the first contact surface 326 of the first restricting section 325. The plurality of rotating bodies 331 do not always have to be provided. Only one rotating body 331 may be provided in any position.

The rotating bodies 331 are not limited to the spherical shape and may have a columnar shape or an annular shape rotating around an axis radially extending from the rotation axis RX. The elastic bodies 332 are not essential and can be omitted.

C. Third Embodiment

Figure 12:
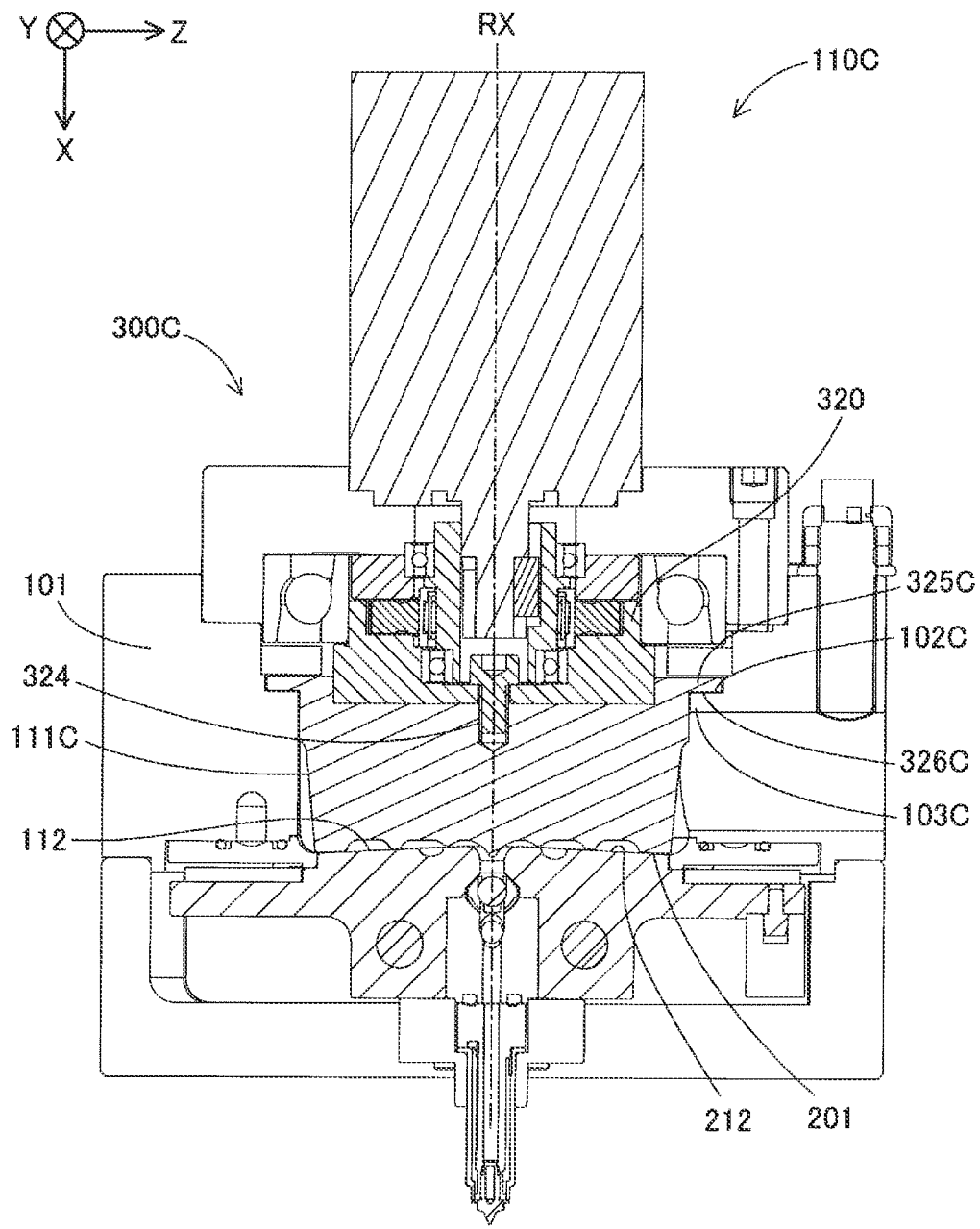
FIG. 12 is a sectional view showing a schematic configuration of a plasticizing device in a third embodiment.

FIG. 12 is a sectional view showing a schematic configuration of a plasticizing device 110C in a third embodiment. In the first embodiment explained above, the first restricting section 325 is provided in the second gear 320 of the speed reducer 300. In contrast, in the third embodiment, a first restricting section 325C is provided in a rotor 111C and is not provided in a speed reducer 300C.

In this embodiment, the bolt 324 functioning as the fixing section fixes the speed reducer 300C and the rotor 111C in a position where a gap is formed between a first contact surface 326C of the first restricting section 325C provided in the rotor 111C and a second contact surface 102C of a second restricting section 103C provided in a housing section 101C. The gap is, for example, 0.1 mm. When the gap is formed between the first contact surface 326C and the second contact surface 102C, the interval between the groove forming surface 201 of the rotor 111C and the opposed surface 212 of the barrel 112 is larger than the gap and is, for example, 0.2 mm.

In the third embodiment configured as explained above, as in the first embodiment, even when the first restricting section 325C fixed to the rotor 111C comes into contact with the second restricting section 103C fixed to the housing section 101C housing the rotor 111C, the rotor 111C and the barrel 112 are separated at a predetermined interval. Accordingly, the rotor 111C is prevented from rotating while keeping a state in which the rotor 111C is in contact with the barrel 112. It is possible to prevent the rotor 111C and the barrel 112 from being worn to have deteriorated durability.

In this embodiment, the bolt 324 fixes the speed reducer 300C and the rotor 111C in the position where the gap is formed between the first contact surface 326C of the first restricting section 325C and the second contact surface 102C of the second restricting section 103C. Accordingly, it is possible to more surely prevent the rotor 111C from coming into contact with the barrel 112.

When the first restricting section 325C is provided in the rotor 111C as in the third embodiment, the speed reducer 300C is not limited to a speed reducer of a coaxial type in which an input shaft and an output shaft are present on the same axis and may be a speed reducer of a parallel axis type or a speed reducer of an orthogonal axis type. The rotor 111C may be directly connected to the driving motor 118 not via the speed reducer 300C.

D. Fourth Embodiment

Figure 13:
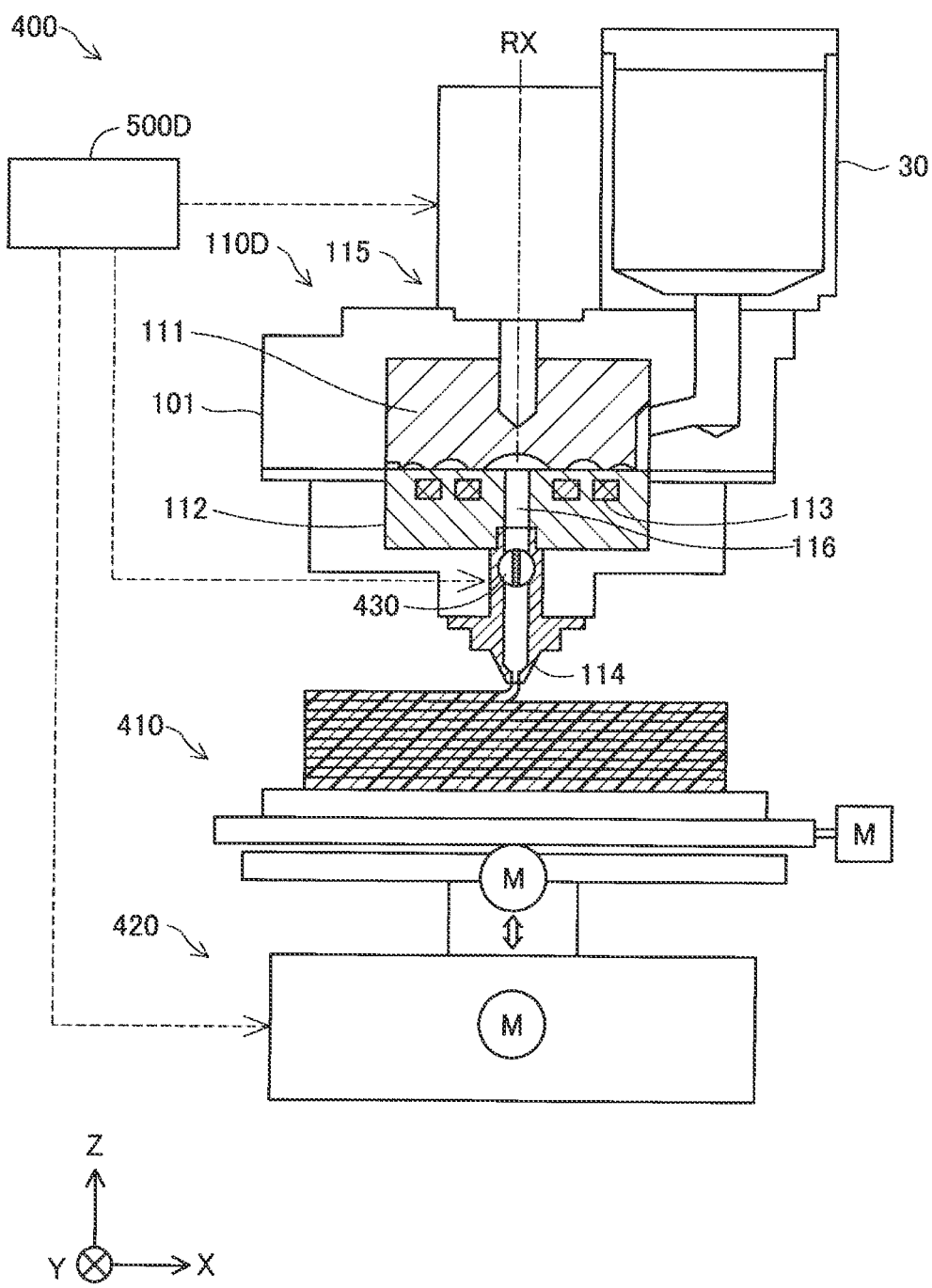
FIG. 13 is a sectional view showing a schematic configuration of a three-dimensional shaping apparatus in a fourth embodiment.

FIG. 13 is a sectional view showing a schematic configuration of a three-dimensional shaping apparatus 400 in a fourth embodiment. The three-dimensional shaping apparatus 400 includes a plasticizing device 110D, a shaping table 410, a moving mechanism 420, and a control section 500D.

The plasticizing device 110D includes the rotor 111, the barrel 112, the heater 113, and the nozzle 114. The configuration of the plasticizing device 110D is the same as the configuration of the plasticizing device 110 in the first embodiment. However, in this embodiment, a valve 430 for switching a discharge amount or presence or absence of discharge of a plasticized material from the nozzle 114 is provided between the communication hole 116 and the nozzle 114. The valve 430 is driven under control by the control section 500D.

The upper surface of the shaping table 410 is opposed to the nozzle 114. A three-dimensional shaped object is shaped on the shaping table 410. In this embodiment, the shaping table 410 extends along the horizontal direction. The shaping table 410 is supported by the moving mechanism 420.

The moving mechanism 420 changes relative positions of the nozzle 114 and the shaping table 410. In this embodiment, the moving mechanism 420 changes the relative positions of the nozzle 114 and the shaping table 410 by moving the shaping table 410. The moving mechanism 420 in this embodiment is configured by a three-axis positioner that moves the shaping table 410 in three-axis directions of the X, Y, and Z directions with power generated by three motors. The motors are driven under the control by the control section 500D. The moving mechanism 420 may be configured to change the relative positions of the nozzle 114 and the shaping table 410 by moving the plasticizing device 110D without moving the shaping table 410. The moving mechanism 420 may be configured to change the relative positions of the nozzle 114 and the shaping table 410 by moving both of the shaping table 410 and the plasticizing device 110D.

The three-dimensional shaping apparatus 400 stacks a layer of a plasticized material on the shaping table 410 and shapes a three-dimensional shaped object having a desired shape by discharging the plasticized material from the nozzle 114 while changing the relative positions of the nozzle 114 and the shaping table 410 under the control by the control section 500D.

In the three-dimensional shaping apparatus 400 in the third embodiment explained above, since the same device as the device in the first embodiment is provided as the plasticizing device 110D, it is possible to prevent wear of the rotor 111 and the barrel 112. Accordingly, it is possible to improve durability of the three-dimensional shaping apparatus 400. The plasticizing device 110D is not limited to the same device as the device in the first embodiment and may be the same device as the device in the second embodiment or the third embodiment.

E. Other Aspects

The present disclosure is not limited to the embodiments explained above and can be realized in various configurations without departing from the gist of the present disclosure. For example, technical features of the embodiments corresponding to technical features in aspects described below can be substituted or combined as appropriate in order to solve a part or all of the problems described above or in order to achieve a part or all of the effects described above. The technical features can be deleted as appropriate unless the technical features are not explained as essential technical features in this specification.

(1) According to a first aspect of the present disclosure, there is provided a plasticizing device that plasticizes at least a part of a material to generate a plasticized material. The plasticizing device includes: a driving motor; a rotor rotated around a rotation axis by the driving motor and having a groove forming surface on which a groove is formed; a barrel having an opposed surface opposed to the groove forming surface, a communication hole into which the plasticized material flows being provided in the barrel; a housing section housing the rotor; a first restricting section fixed to the rotor and having a first contact surface facing the barrel side; and a second restricting section fixed to the housing section, opposed to the first contact surface, and having a second contact surface contactable with the first contact surface. Movement of the rotor along the rotation axis is restricted by the first restricting section and the second restricting section. The groove forming surface is separated from the opposed surface at a predetermined interval in a state in which the first contact surface and the second contact surface are in contact.

According to such an aspect, even when the first restricting section fixed to the rotor comes into contact with the second restricting section fixed to the housing section housing the rotor, the rotor and the barrel are separated at the predetermined interval. Accordingly, the rotor is prevented from rotating while keeping a state in which the rotor is in contact with the barrel. It is possible to prevent the rotor and the barrel from being worn to have deteriorated durability.

(2) In the aspect, the plasticizing device may further include a speed reducer connected to the driving motor and the rotor, the speed reducer and the rotor may be fixed by a fixing section, and the fixing section may fix the speed reducer and the rotor in a position where the groove forming surface is separated from the opposed surface at the interval in the state in which the first contact surface and the second contact surface are in contact. According to such an aspect, it is possible to fix the rotor to the speed reducer such that the rotor and the barrel do not come into contact.

(3) In the aspect, the speed reducer may include: a first gear including external teeth and configured to receive a driving force from the driving motor and swing in a direction crossing the rotation axis; and a second gear including internal teeth and configured to rotate when the external teeth of the first gear come into contact with the internal teeth, and the fixing section may fix the second gear and the rotor. According to such an aspect, since the rotor is fixed to the second gear of the speed reducer, it is possible to more surely prevent the rotor from coming into contact with the barrel.

(4) In the aspect, the first restricting section may be provided in the second gear. According to such an aspect, it is possible to prevent the first restricting section from coming into contact with the second restricting section to wear the rotor.

(5) In the aspect, the first restricting section may be provided in the rotor, and the fixing section may fix the speed reducer and the rotor in a position where a gap is formed between the first contact surface and the second contact surface. According to such an aspect, it is possible to more surely prevent the rotor from coming into contact with the barrel.

(6) In the aspect, a first distance between the first contact surface and the second contact surface may be smaller than a second distance between the groove forming surface and the opposed surface irrespective of a contact state of the first contact surface and the second contact surface. According to such an aspect, it is possible to more surely prevent the rotor from coming into contact with the barrel.

(7) In the aspect, the first restricting section may have a third contact surface on an opposite side of the first contact surface, and the housing section may include a third restricting section having a fourth contact surface contactable with the third contact surface. According to such an aspect, it is possible to prevent the rotor from excessively moving to the driving motor side in the direction along the rotation axis. Therefore, it is possible to prevent plasticizing performance of the material from being deteriorated by the movement of the rotor to the driving motor side.

(8) In the aspect, a rotating body may be provided on the first contact surface or the second contact surface. According to such an aspect, it is possible to reduce sliding resistance between the first contact surface and the second contact surface. Since the first restricting section is prevented from approaching the second restricting section by the rotating body, it is possible to prevent the rotor from coming into contact with the barrel.

(9) In the aspect, a plurality of the rotating bodies may be provided along a circumferential direction centering on the rotation axis. According to such an aspect, it is possible to prevent rotation axis deflection from occurring in the rotor.

(10) A second aspect of the present disclosure is directed to an injection molding apparatus including: the plasticizing device in the aspect described above; and a nozzle for ejecting, to a molding die, the plasticized material flowing out from the communication hole.

(11) A third aspect of the present disclosure is directed to a three-dimensional shaping apparatus including: the plasticizing device in the aspect described above; and a nozzle for discharging, toward a shaping table, the plasticized material flowing out from the communication hole.

What is claimed is:

1. A plasticizing device that plasticizes at least a part of a material to generate a plasticized material, the plasticizing device comprising:

a driving motor;

a rotor rotated around a rotation axis by the driving motor and having a groove forming surface on which a groove is formed;

a barrel having an opposed surface opposed to the groove forming surface, a communication hole into which the plasticized material flows being provided in the barrel;

a housing section housing the rotor;

a first restricting section fixed to the rotor and having a first contact surface facing the barrel side; and a second restricting section fixed to the housing section, opposed to the first contact surface, and having a second contact surface contactable with the first contact surface, wherein movement of the rotor along the rotation axis is restricted by the first restricting section and the second restricting section, and the groove forming surface is separated from the opposed surface at a predetermined interval in a state in which the first contact surface and the second contact surface are in contact.

2. The plasticizing device according to claim 1, further comprising a speed reducer connected to the driving motor and the rotor, wherein the speed reducer and the rotor are fixed by a fixing section, and the fixing section fixes the speed reducer and the rotor in a position where the groove forming surface is separated from the opposed surface at the interval in the state in which the first contact surface and the second contact surface are in contact.

3. The plasticizing device according to claim 2, wherein the speed reducer includes:

a first gear including external teeth and configured to receive a driving force from the driving motor and swing in a direction crossing the rotation axis; and a second gear including internal teeth and configured to rotate when the external teeth of the first gear come into contact with the internal teeth, and the fixing section fixes the second gear and the rotor.

4. The plasticizing device according to claim 3, wherein the first restricting section is provided in the second gear.

5. The plasticizing device according to claim 2, wherein the first restricting section is provided in the rotor, and the fixing section fixes the speed reducer and the rotor in a position where a gap is formed between the first contact surface and the second contact surface.

6. The plasticizing device according to claim 1, wherein a first distance between the first contact surface and the second contact surface is smaller than a second distance between the groove forming surface and the opposed surface irrespective of a contact state of the first contact surface and the second contact surface.

7. The plasticizing device according to claim 1, wherein the first restricting section has a third contact surface on an opposite side of the first contact surface, and the housing section includes a third restricting section having a fourth contact surface contactable with the third contact surface.

8. The plasticizing device according to claim 1, wherein a rotating body is provided on the first contact surface or the second contact surface.

9. The plasticizing device according to claim 8, wherein a plurality of the rotating bodies are provided along a circumferential direction centering on the rotation axis.

10. An injection molding apparatus comprising:

the plasticizing device according to claim 1; and a nozzle for ejecting, to a molding die, the plasticized material flowing out from the communication hole.

11. A three-dimensional shaping apparatus comprising:

the plasticizing device according to claim 1; and a nozzle for discharging, toward a shaping table, the plasticized material flowing out from the communication hole.

* * * * *